United States Patent
Masui et al.

(10) Patent No.: US 7,550,877 B2
(45) Date of Patent: Jun. 23, 2009

(54) ELECTRONIC APPARATUS AND POWER SUPPLY CONTROLLING METHOD

(75) Inventors: Ichiro Masui, Chiba (JP); Katsunori Ogawa, Kanagawa (JP); Kenichi Sakai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/876,923

(22) Filed: Oct. 23, 2007

(65) Prior Publication Data

US 2008/0055104 A1 Mar. 6, 2008

Related U.S. Application Data

(63) Continuation of application No. 10/508,629, filed as application No. PCT/JP03/00645 on Jan. 24, 2003, now abandoned.

(30) Foreign Application Priority Data

Mar. 20, 2002 (JP) ............................ P2002-077730

(51) Int. Cl.
*H02J 9/04* (2006.01)
*H02J 1/10* (2006.01)
*H01H 35/00* (2006.01)
*H01H 45/14* (2006.01)
*H01H 67/00* (2006.01)

(52) U.S. Cl. ..................................................... 307/126
(58) Field of Classification Search .................. None
See application file for complete search history.

(56) References Cited

U.S. PATENT DOCUMENTS 6,151,652 A 11/2000 Kondo et al.
6,271,605 B1 * 8/2001 Carkner et al. .............. 307/125
6,580,460 B1 6/2003 Takahashi et al.
6,661,462 B2 * 12/2003 Ohnogi ........................ 348/372
6,662,301 B1 * 12/2003 Sekine et al. ................ 713/320
6,753,921 B1 * 6/2004 Shimizu ....................... 348/372

(Continued)

FOREIGN PATENT DOCUMENTS

EP 0 862 313 9/1998

(Continued)

*Primary Examiner*—Fritz M. Fleming
*Assistant Examiner*—Adi Amrany
(74) *Attorney, Agent, or Firm*—Frommer Lawrence & Haug LLP; William S. Frommer; Thomas F. Presson (57) ABSTRACT

The present invention relates to an electronic apparatus and a power supply controlling method with which input power source is switched efficiently in accordance with a load of a device. A power controller 50, upon detecting a USB connection, monitors power consumption of a CPU 44 based on the operation status of the CPU 44, and controls a switch 42 in accordance with a current supplied from a USB cable 2. When the current is less than or equal to 500 mA, the switch 42 is switched to a terminal a. Before configuration, when the current is less than or equal to 100 mA, the switch 42 is switched to the terminal a, and then a regulator 43 is controlled so that the current will not exceed 100 mA. In USB suspend, the switch 42 is switched to a terminal b, and a regulator 53 stops output to a backup battery 54. The present invention can be applied to a digital still camera supporting USB.

8 Claims, 5 Drawing Sheets

U.S. PATENT DOCUMENTS

| | | | |
|---|---|---|---|
| 6,885,115 B2 * | 4/2005 | Hatori et al. | 307/80 |
| 6,977,688 B2 * | 12/2005 | Hanada et al. | 348/372 |
| 6,983,383 B1 | 1/2006 | Saito et al. | |
| 7,154,553 B2 * | 12/2006 | Horii et al. | 348/372 |
| 7,197,650 B2 * | 3/2007 | Watanabe et al. | 713/300 |

FOREIGN PATENT DOCUMENTS

| | | |
|---|---|---|
| JP | 10-243327 | 9/1998 |
| JP | 2000-184264 | 6/2000 |
| JP | 2001-331241 | 11/2001 |
| JP | 2002-237971 | 8/2002 |

* cited by examiner

FIG. 5

ELECTRONIC APPARATUS AND POWER SUPPLY CONTROLLING METHOD

This is a Continuation Application of U.S. Ser. No. 10/508,629, filed Sep. 16, 2004, now abandoned which is a 371 Application of PCT/JP03/00645, filed Jan. 24, 2003, which claims the benefit of Japanese Application Japan P2002-077730, filed on Mar. 20, 2002, all of which are hereby incorporated by reference in their entirety herein.

TECHNICAL FIELD

The present invention relates to electronic apparatuses and power supply controlling methods. Particularly, the present invention relates to an electronic apparatus and a power supply controlling method with which input power source is switched in accordance with a load of a device when a portable electronic device such as a digital still camera is connected to another electronic device via an external interface.

BACKGROUND ART

Recently, battery-operated portable electronic devices having USB (Universal Serial Bus) interfaces, such as digital still cameras, are becoming common. Such devices can be connected to other electronic devices via USB cables.

Such a portable electronic device is capable of operating by electric power supplied from another electronic device via a USB cable, without using a battery.

According to the USB standard, a current up to 500 mA can be supplied. However, when a portable electronic device is connected to another electronic device via a USB cable, if the power source is simply switched to electric power supplied from the USB cable, operation is not allowed when a current exceeding 500 mA is needed.

Furthermore, in a portable electronic device, when a backup battery (e.g., a secondary battery or a capacitor) is charged during USB suspend, a consumption current supplied from the USB bus becomes greater than or equal to 500 μA, so that the USB standard is not satisfied.

That is, when the current exceeds the value defined by the USB standard, error could occur in signal processing or the like.

DISCLOSURE OF INVENTION

The present invention has been made in view of the situation described above, and it aims at switching input power source efficiently in accordance with a load of a device.

A power supply controlling apparatus according to the present invention comprises first switching means for switching between first electric power of an electronic apparatus and second electric power supplied from another electronic apparatus via a cable, and supplying either the first electric power or the second electric power to a first power supply line; second switching means for switching from the first electric power to the second electric power and supplying the second electric power to a second power supply line when the second electric power is supplied from the another electronic apparatus; determining means for determining whether the second electric power supplied from the another electronic apparatus is less than or equal to a predetermined threshold value; and controlling means for controlling the first switching means based on a result of determination by the determining means.

The power supply controlling apparatus may be such that detecting means for detecting a connection with the another electronic apparatus is further provided, the determining means determines whether the second electric power is less than or equal to the predetermined threshold value when the detecting means has detected a connection with the another electronic apparatus, and that the controlling means controls switching of the first switching means so that the second electric power will be supplied to the first power supply line when the determining means has determined that the second electric power is less than or equal to the predetermined threshold value.

The power supply controlling apparatus may also be such that setting processing means for executing processing for setting that is needed for connection with the another electronic apparatus is further provided, the determining means determines whether the second electric power is less than or equal to the predetermined threshold value when the setting processing means is finished, and that the controlling means controls switching of the first switching means so that the second electric power will be supplied to the first power supply line when the determining means has determined that the second electric power is less than or equal to the threshold value.

The power supply controlling apparatus may further comprise charging means for charging a backup battery when the second electric power is being supplied from the another electronic apparatus via the cable.

The power supply controlling apparatus may be such that detecting means for detecting a suspend status of the electronic connected to the another electronic apparatus via the cable is further provided, and that when the detecting means has detected the suspend status, the charging means stops charging of the backup battery, and the controlling means controls switching of the first switching means so that the first electric power will be supplied to the first power supply line.

The cable may be a USB cable or an IEEE 1394 cable.

A power supply controlling method according to the present invention comprises a first switching step of switching between first electric power of an electronic apparatus and second electric power supplied from another electronic apparatus via a cable, and supplying either the first electric power or the second electric power to a first power supply line; a second switching step of switching from the first electric power to the second electric power and supplying the second electric power to a second power supply line when the second electric power is supplied from the another electronic apparatus; a determining step of determining whether the second electric power supplied from the another electronic apparatus is less than or equal to a predetermined threshold value; and a controlling step of controlling processing in the first switching step based on a result of determination by processing in the determining step.

In the electronic apparatus or the power supply controlling method according to the present invention, switching between first electric power of an electronic apparatus and second electric power supplied from another electronic apparatus via a cable is executed and either the first electric power or the second electric power is supplied to a first power supply line. When the second electric power is supplied from the another electronic apparatus, switching from the first electric power to the second electric power takes place and the second electric power is supplied to a second power supply line. It is determined whether the second electric power supplied from the another electronic apparatus is less than or equal to a predetermined threshold value, and electric power supplied to the first power supply line is switched based on a result of the determination.

BEST MODE FOR CARRYING OUT THE INVENTION

Now, an embodiment of the present invention will be described with reference to the drawings.

Figure 1:
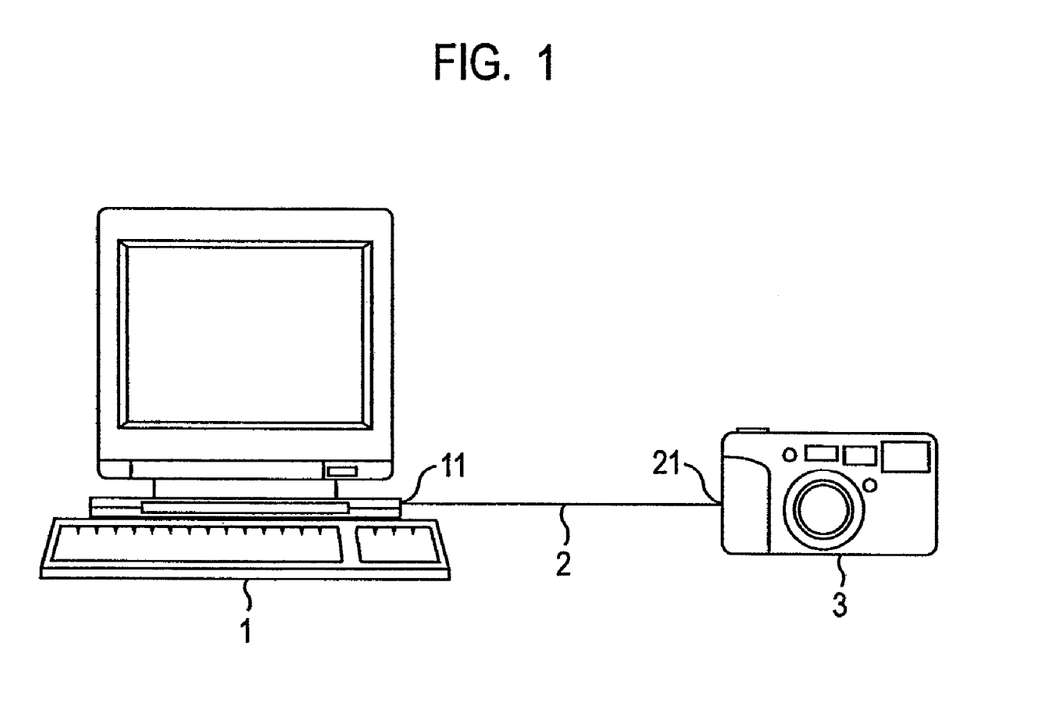
FIG. 1 is a diagram showing an example connection between a personal computer and a digital still camera according to the present invention.

FIG. 1 is a diagram showing an example connection between a personal computer and a digital still camera according to the present invention. Referring to the figure, a USB port 11 of a personal computer 1 is connected to one end of a USB cable 2, and the other end of the USB cable 2 is connected to a USB port 21 of a digital still camera 3. Thus, the personal computer 1 and the digital still camera 3 are USB-connected to each other.

The personal computer 1 is either connected to a power source that is not shown and operates by a power supply voltage thereof, or operates by electric power of a battery that is not shown. Furthermore, the personal computer 1 supplies electric power to the digital still camera 3 through the USB cable 2.

The digital still camera 3 operates by electric power of a battery 41 (FIG. 2), and also operates by electric power that is supplied from the personal computer 1 through the USB cable 2.

Figure 2:
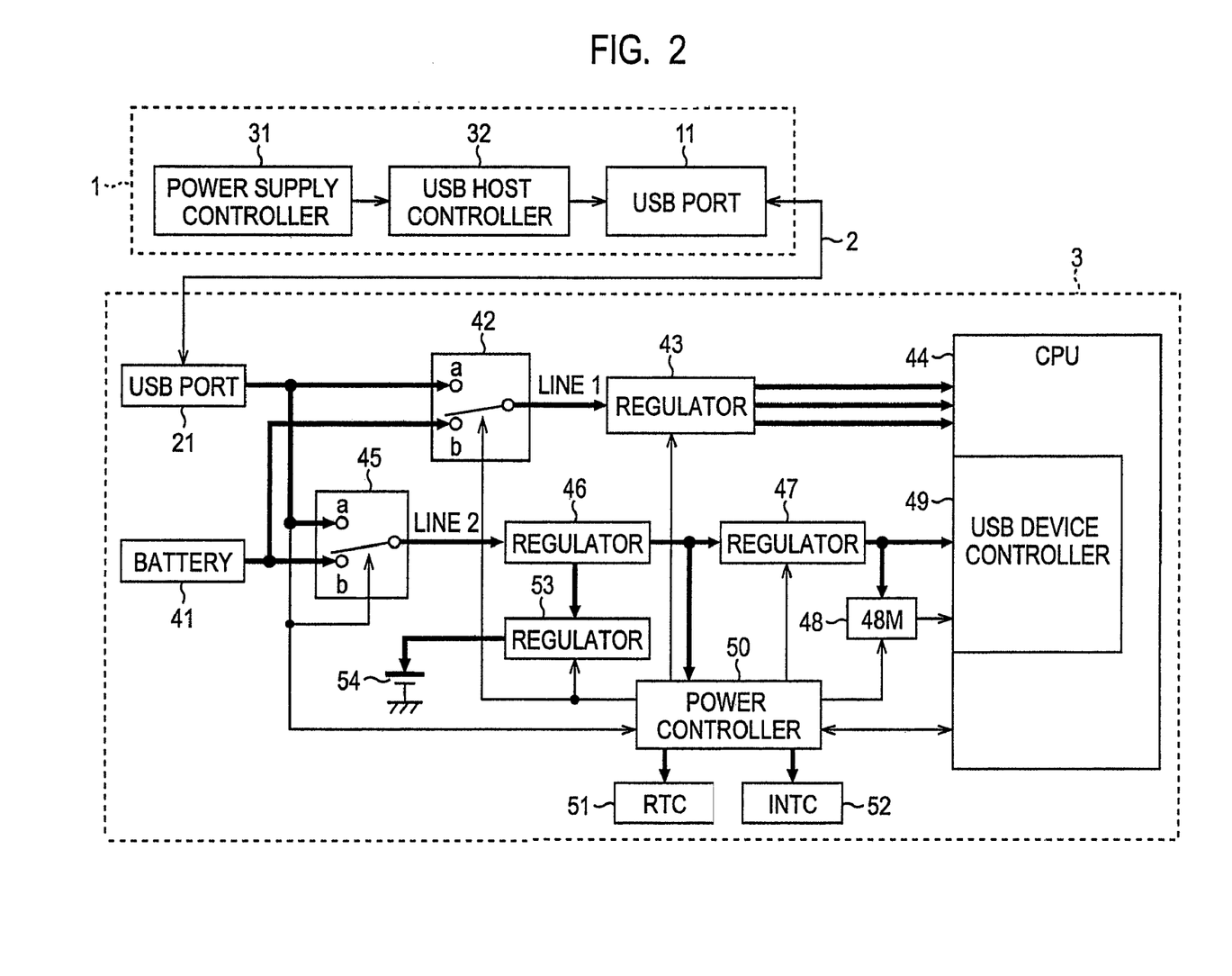
FIG. 2 is a diagram showing example internal configurations of the personal computer and the digital still camera.

FIG. 2 is a diagram showing example internal configurations of the personal computer 1 and the digital still camera 3. Note that the figure only shows components relating to power supply.

The personal computer 1 includes a power supply controller 31, a USB host controller 32, and the USB port 11. Although not shown, the personal computer 1 also includes a central processing unit (CPU) for executing various processing, a read only memory (RAM) for storing programs for executing various processing, a random access memory (RAM) for storing data needed for executing various processing, input devices such as a keyboard and a mouse, a display implemented by a cathode-ray tube (CRT) display or a liquid crystal display (LCD), a speaker, a hard disk drive, and so forth.

The power supply controller 31, based on a power supply voltage supplied from a power source that is not shown, exercises control to supply electric power to the components of the personal computer 1, and exercises control to supply electric power to the USB host controller 32, the USB port 11, and the digital still camera 3 connected via the USB cable 2.

The USB host controller 32 exercises connection control (configuration) for the digital still camera 3 connected via the USB port 11 and the USB cable 2 so that electric power will be supplied from the power supply controller 31 to the digital still camera 3.

The digital still camera 3 includes a USB port 21, a battery 41, switches 42 and 45, regulators 43, 46, 47, and 53, a CPU 44, a USB clock 48, a USB device controller 49, a power controller 50, a real-time clock (RTC) 51, an interrupt controller (INTC: Interrupt Clock) 52, and a backup battery 54. Although not shown, the digital still camera 3 also includes a camera signal processor that executes predetermined processing on captured images of objects, and an LCD that displays captured images.

A terminal a of the switch 42 receives electric power through the USB cable 2, and a terminal b thereof receives electric power from the battery 41. The switch 42, under the control of the power controller 50, is switched to the terminal a when electric power from the USB cable 2 is to be supplied to a power supply line 1, and is switched to the terminal b when electric power from the battery 41 is to be supplied to the power supply line 1.

A terminal a of the switch 45 receives electric power from the USB cable 2, and a terminal b thereof receives electric power from the battery 41. The switch 45, upon detecting a USB connection (i.e., when a current is detected due to connection with the USB cable 2), is forcibly switched to the terminal a so that electric power from the USB cable 2 will be supplied to a power supply line 2. On the other hand, when a USB connection is not detected, the switch 45 is switched to a terminal B so that electric power from the battery 41 will be supplied to the power supply line 2.

The regulator 43, under the control of the power controller 50, converts the power supply voltage supplied via the switch 42 from the USB cable 2 or the battery 41 into a voltage of a constant level needed by the CPU 44, and supplies the voltage to the CPU 44 through one or more output lines (three lines in this example). Thus, the CPU 44 is allowed to operate by the electric power supplied from the regulator 43.

The regulator 46 converts the power supply voltage supplied via the switch 45 from the USB cable 2 or the battery 41 into a voltage of a constant level needed by the power controller 50, the real-time clock 51, and the interrupt controller 52, and supplies the voltage to each of these components. Thus, the power controller 50, the real-time clock 51, and the interrupt controller 52 are allowed to operate by the electric power supplied from the regulator 46. The regulator 46 also supplies the voltage of the constant level obtained by the conversion to the regulator 47 and the regulator 53.

The regulator 47, under the control of the power controller 50, converts the voltage supplied from the regulator 46 into a voltage of a constant level needed by the USB device controller 49, and supplies the voltage to the USB device controller 49 and to the USB clock 48. Thus, the USB clock 48 and the USB device controller 49 are allowed to operate by the electric power supplied from the regulator 47.

The regulator 53, under the control of the power controller 50, converts the voltage supplied from the regulator 46 into a voltage of a constant level needed by the backup battery 54, and supplies the voltage to the backup battery 54.

The USB device controller 49 operates by a voltage supplied from the regulator 47, and exercises connection control (configuration) on the personal computer 1 connected via the USB port 21 and the USB cable 2. Configuration refers to, for example, loading configuration data that defines setting information (logic functions or wire connections) for USB connection.

The power controller 50 operates by a voltage supplied from the regulator 46. Upon detecting a USB connection, the power controller 50 monitors power consumption of the CPU 44 based on the operation status of the CPU 44 (e.g., ON/OFF of 3V circuitry, ON/OFF of 5V circuitry, and ON/OFF of the power of the LCD). The power controller 50 exercises control so that the switch 42 will be switched to the terminal a when the current supplied from the USB cable 2 is less than or equal to 500 mA and so that the switch 42 will be switched to the terminal b when the current supplied from the USB cable 2 is greater than 500 mA.

Before configuration, the power controller 50 monitors power consumption based on the operation status of the CPU 44. The power controller 50 exercises control so that the switch 42 will be switched to the terminal a when the current supplied from the USB cable 2 is less than or equal to 100 mA and controls the regulator 43 so that the current supplied from the USB cable 2 will not exceed 100 mA when the switch 42 is switched. Under this situation, the USB device controller 49 executes configuration.

More specifically, before USB configuration, when the current supplied from the USB cable 2 exceeds 100 mA, the switch 42 is kept switched to the terminal b even if a current is being supplied from the USB cable 2.

During USB suspend, the power controller 50 exercises control so that the switch 42 will be switched to the terminal b and so that the regulator 53 will stop output to the backup battery 54.

The power controller 50 controls the respective operations of the CPU 44, the regulator 47, the USB clock 48, and other parts.

The backup battery 54 is implemented by a device that is included in the digital still camera 3 and that allows charging and discharging, such as a secondary battery or a capacitor, the device allowing execution of basic functions of the digital still camera 3 (e.g., internal clock and memory) when the digital still camera 3 is detached from a power source such as the battery 41. The backup battery 54 is charged by a voltage that is supplied from the regulator 53.

Next, a power supply process that is executed by the digital still camera 3 will be described with reference to a flowchart shown in FIG. 3.

In step S1, the power controller 50 determines (detects) whether a USB connection with the personal computer 1 via the USB port 21 and the USB cable 2 is established, and waits until a USB connection is established.

When it is determined in step S1 that a USB connection is established, the process proceeds to step S2, in which a power supply process before USB configuration is executed.

Figure 4:
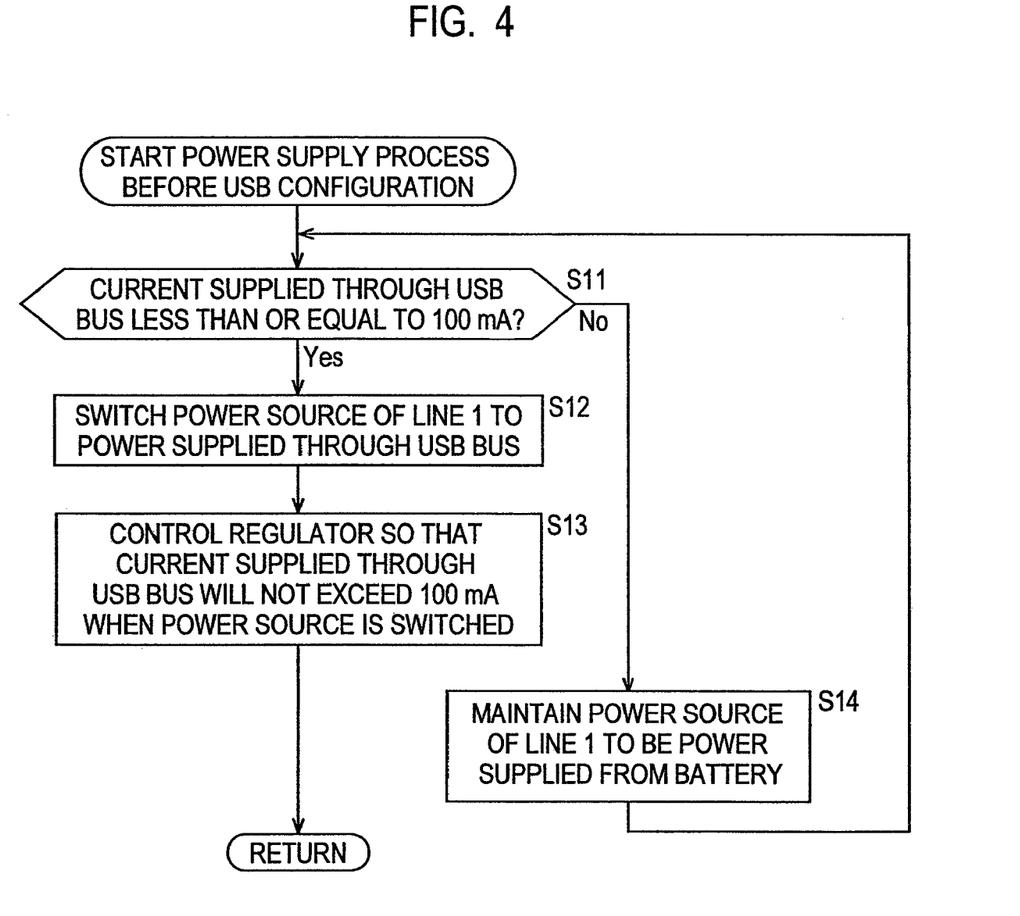
FIG. 4 is a flowchart for further explaining a power supply process before USB configuration, i.e., step S2 in FIG. 3.

Now, the power supply process before USB configuration will be described in detail with reference to a flowchart shown in FIG. 4.

In step S11, the power controller 50 monitors power consumption based on the operation status of the CPU 44, and determines whether the current supplied from the USB cable 2 is less than or equal to 100 mA. If it is determined that the current supplied from the USB cable 2 exceeds 100 mA, the process proceeds to step S14.

In step S14, the power controller 50 exercises control so that the switch 42 will be kept switched to the terminal b. Then, the process returns to step S11, and the process described above is repeated. That is, when the current supplied from the USB cable 2 exceeds 100 mA, electric power from the battery 41 is supplied to the power supply line 1.

If it is determined in step S11 that the current supplied from the USB cable 2 is less than or equal to 100 mA, the process proceeds to step S12, in which the power controller 50 exercises control so that the switch 42 will be switched to the terminal a. Thus, electric power from the USB cable 2 is supplied to the power supply line 1.

In step S13, the power controller 50 controls the regulator 43 so that the current from the USB cable 2 will not exceed 100 mA when the switch 42 is switched. The USB device controller 49 executes configuration with the personal computer 1 connected via the USB cable 2. The process then returns to step S3 shown in FIG. 3.

In step S3, the USB device controller 49 determines whether configuration is completed. If it is determined that configuration is not completed, the process returns to step S2, and the processing described above is repeated.

If it is determined in step S3 that configuration is completed, the process proceeds to step S4, in which a power supply process in an established USB connection is executed.

Figure 5:
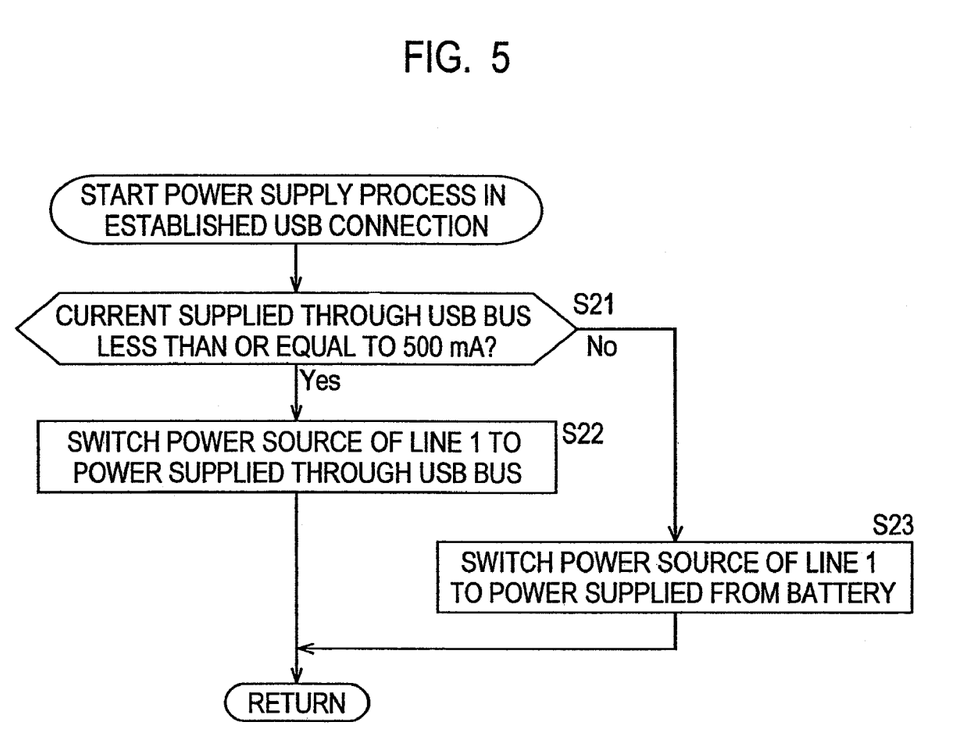
FIG. 5 is a flowchart for further explaining a power supply process in an established USB connection, i.e., step S4 in FIG. 3.

Now, the power supply process in an established USB connection will be described with reference to a flowchart shown in FIG. 5.

In step S21, the power controller 50 monitors power consumption based on the operation status of the CPU 44, and determines whether the current supplied from the USB cable 2 is less than or equal to 500 mA. If it is determined that the current supplied from the USB cable 2 is less than or equal to 500 mA, the process proceeds to step S22.

In step S22, the power controller 50 exercises control so that the switch 42 will be switched to the terminal a. Thus, electric power from the USB cable 2 is supplied to the power supply line 1.

If it is determined in step S21 that the current supplied from the USB cable 2 exceeds 500 mA, the process proceeds to step S23, in which the power controller 50 exercises control so that the switch 42 will be switched to the terminal b. Thus, electric power from the battery 41 is supplied to the power supply line 1.

Figure 3:
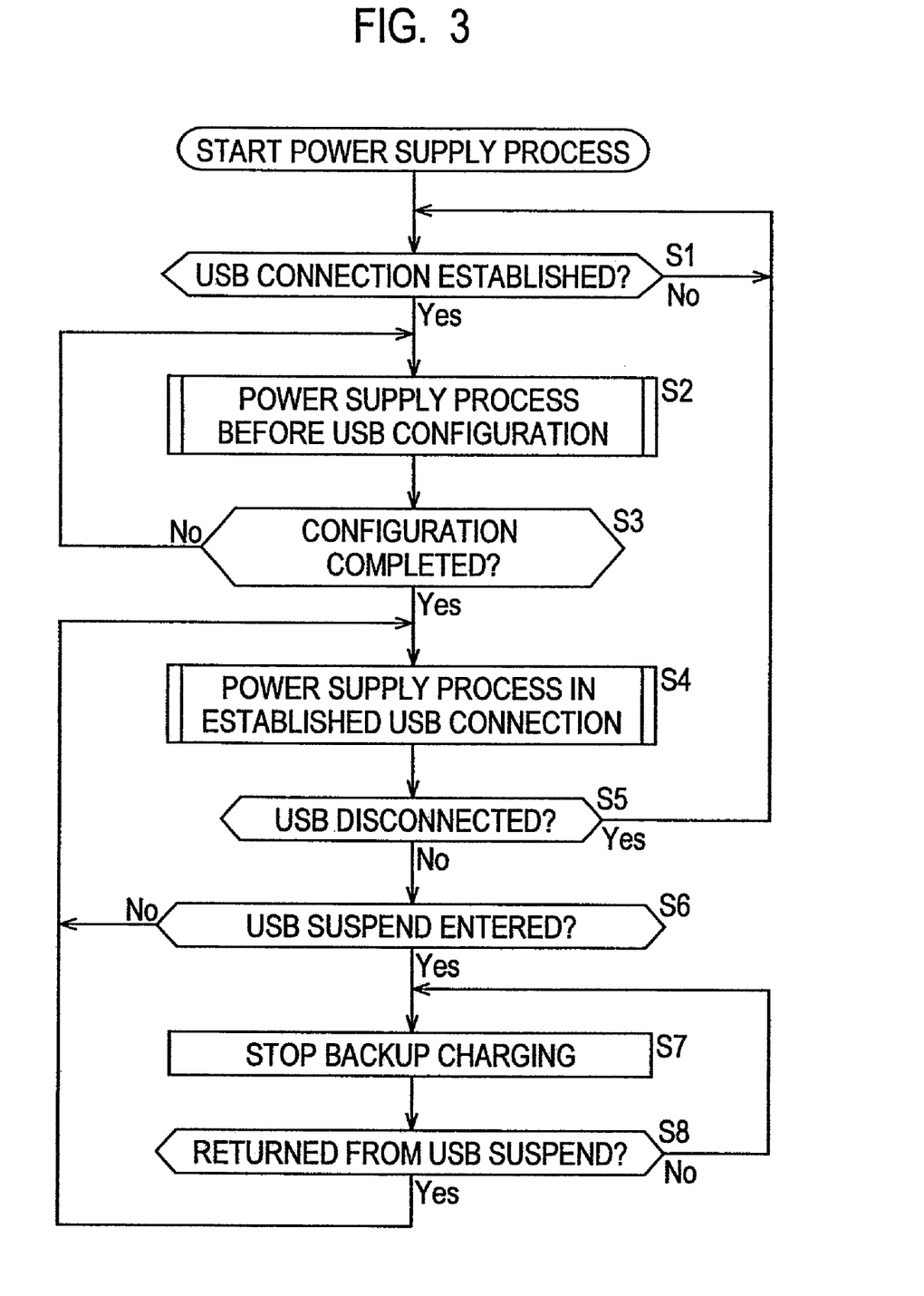
FIG. 3 is a flowchart for explaining a power supply process.

Upon completion of processing in step S22 or step S23, the process returns to step S5 shown in FIG. 3.

In step S5, the power controller 50 determines whether the USB connection is disconnected. If it is determined that the USB connection is disconnected, the process returns to step S1, and the subsequent processing described above is repeated.

If it is determined in step S5 that the USB connection is not disconnected, i.e., when it is determined that the USB connection is maintained, the process proceeds to step S6.

In step S6, the power controller 50 determines whether USB suspend has been entered. If it is determined that USB suspend has not been entered, the process returns to step S4, and the subsequent processing described above is repeated.

If it is determined in step S6 that USB suspend has been entered, the process proceeds to step S7, in which the power controller 50 exercises control so that the switch 42 will be switched to the terminal b and so that the regulator 53 will stop output to the backup battery 54. Thus, electric power from the battery 41 is supplied to the power supply line 1, and the charging of the backup battery 54 is stopped. Accordingly, the current supplied from the USB bus is maintained to be less than or equal to 500 mA.

In step S8, the power controller 50 determines whether the device has returned from USB suspend. If it is determined that the device has not returned from USB suspend, the process returns to step S7, and the processing described above is repeated.

If it is determined in step S8 that the device has returned from USB suspend, the process returns to step S4, and the subsequent processing described above is repeated. That is, the power supply process in an established USB connection, described with reference to FIG. 5, is executed again.

As described above, the power controller 50 of the digital still camera 3 switches input power source in accordance with a load of the device, so that electric power from the USB bus is used efficiently and the load of the battery 41 is reduced.

During USB suspend, charging of the backup battery 54 is stopped, so that wasteful power consumption is minimized.

Furthermore, in an established USB connection, the blocks that are at least needed for the operation of the device (the power controller 50, the real-time clock 51, the interrupt controller 52, etc.) are allowed to operate by electric power supplied from the USB bus. This reduces the load of the battery 41 in an established USB connection.

The description has been made hereinabove in the context of an example where the personal computer 1 and the digital still camera 3 are USB-connected with each other. However, the present invention can be applied widely to information processing apparatuses that are capable of supplying electric power to electronic devices supporting USB and that include the USB host controller 32, as well as the personal computer 1. Also, the present invention can be applied widely to portable electronic devices supporting USB, such as camcorders and personal digital assistants (PDAs), as well as the digital still camera 3.

Furthermore, according to the present invention, although input power source is efficiently switched in an established USB connection, without limitation to USB, for example, when a connection with an IEEE 1394 (Institute of Electrical and Electronic Engineers) bus is established, it is possible to switch input power source efficiently in accordance with the standard. In that case, input power source is switched according to whether the current supplied through the IEEE 1394 bus exceeds 1.5 A.

INDUSTRIAL APPLICABILITY

According to the present invention, input power source is switched efficiently according to a load of a device.

Furthermore, according to the present invention, when an electronic device is connected to another electronic device via an external interface, input power source is switched efficiently according to a load of the device. This reduces the load of a battery.

The invention claimed is:

1. A power control apparatus of an electronic apparatus powered by a battery device and connected to a second electronic apparatus via a cable, the power control apparatus comprising:
    a first switch that switches between first electric power of the battery device of the electronic apparatus and second electric power supplied from the second electronic apparatus via the cable, and supplying either the first electric power or the second electric power to a first power supply line connected to a CPU;
    a second switch that supplies the first electric power or the second electric power to a second power supply line connected to one or more components for the operation of the electronic apparatus;
    determining means for determining whether the second electric power supplied from the second electronic apparatus is less than or equal to a predetermined threshold value;
    controlling means for monitoring a power consumption of the CPU and for controlling the first switch based on a result of determination by the determining means and the power consumption of the CPU; and
    converting means for converting a power supply voltage into voltage of a constant level determined by a regulator and utilized by a power controller, a real-time clock and an interrupt controller,
    wherein each of the first switch and the second switch includes a first terminal that connects with the first electric power and a second terminal that connects with the second electric power,
    wherein when connection with the second electronic apparatus is detected, the second switch supplies the second electric power to the second power supply line, and
    wherein when connection with the second electronic apparatus is not detected, the second switch supplies the first electric power to the second power supply line.

2. The electronic apparatus according to claim 1,
    further comprising detecting means for detecting a connection with the second electronic apparatus;
        wherein the determining means determines whether the second electric power is less than or equal to the predetermined threshold value when the detecting means has detected a connection with the second electronic apparatus, and
        wherein the controlling means controls switching of the first switch so that the second electric power will be supplied to the first power supply line when the determining means has determined that the second electric power is less than or equal to the predetermined threshold value.

3. The electronic apparatus according to claim 1,
    further comprising setting processing means for executing processing for setting that is needed for connection with the second electronic apparatus,
        wherein the determining means determines whether the second electric power is less than or equal to the predetermined threshold value when the setting processing means is finished, and
        wherein the controlling means controls switching of the first switch so that the second electric power will be supplied to the first power supply line when the determining means has determined that the second electric power is less than or equal to the threshold value.

4. The electronic apparatus according to claim 1,
    further comprising charging means for charging a backup battery when the second electric power is being supplied from the second electronic apparatus via the cable.

5. The electronic apparatus according to claim 4,
    further comprising detecting means for detecting the second electrical power of the connected second electronic apparatus is not supplied to the first and second switches,
        wherein when the detecting means has detected that the second electrical power of the connected second electronic apparatus is not supplied to the first and second switches, the charging means stops charging of the backup battery, and
        wherein the controlling means controls switching of the first switch so that the first electric power will be supplied to the first power supply line.

6. The electronic apparatus according to claim 1, wherein the one or more components include one or more power controllers.

7. The electronic apparatus according to claim 1, wherein the one or more components include one or more regulators.

8. A power supply controlling method for a power control apparatus of an electronic apparatus powered by a battery device and that is connected to a second electronic apparatus via a cable, the power supply controlling method comprising:
    switching, by a first switch, between first electric power of the battery device of the electronic apparatus and second electric power supplied from the second electronic apparatus via the cable, and supplying either the first electric power or the second electric power to a first power supply line connected to a CPU;
    supplying, by a second switch, the first electric power or the second electric power to a second power supply line connected to one or more components used for the operation of the electronic apparatus;
    determining whether the second electric power supplied from the second electronic apparatus is less than or equal to a predetermined threshold value;
    monitoring a power consumption of the CPU;
    controlling processing in the first switching step based on a result of determination by processing in the determining step and the power consumption of the CPU; and
    converting a power supply voltage into voltage of a constant level determined by a regulator and utilized by a power controller, a real-time clock and an interrupt controller,
    wherein each of the first switch and the second switch includes a first terminal that connects with the first electric power and a second terminal that connects with the second electric power,
    wherein when connection with the second electronic apparatus is detected, the second switch supplies the second electric power to the second power supply line, and
    wherein when connection with the another electronic apparatus is not detected, the second switch supplies the first electric power to the second power supply line.

* * * * *